United States Patent [19]

Leiber

[11] Patent Number: 4,545,240
[45] Date of Patent: Oct. 8, 1985

[54] APPARATUS FOR ASCERTAINING THE ADHESION FACTOR OF A ROAD SURFACE

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 705,420

[22] PCT Filed: Jan. 7, 1982

[86] PCT No.: PCT/DE82/00006
    § 371 Date: Aug. 19, 1982
    § 102(e) Date: Aug. 19, 1982

[87] PCT Pub. No.: WO82/04019
    PCT Pub. Date: Nov. 25, 1982

Related U.S. Application Data

[63] Continuation of Ser. No. 413,357, Aug. 19, 1982, abandoned.

[30] Foreign Application Priority Data

May 14, 1981 [DE] Fed. Rep. of Germany ....... 3119153

[51] Int. Cl.$^4$ ............................................ B10G 19/10
[52] U.S. Cl. ..................................... 73/146; 340/52 B; 340/52 R; 303/105; 73/9
[58] Field of Search ............ 73/9, 126, 128, 132, 73/146; 188/181 R; 303/94, 95, 102, 103, 105, 106, 109; 324/133; 340/52 R, 52 B, 69; 343/13 R; 364/424, 426

[56] References Cited

U.S. PATENT DOCUMENTS

| | | | |
|---|---|---|---|
| 3,431,776 | 3/1969 | Hughes. | |
| 3,606,493 | 9/1971 | Schlitz | 340/52 R |
| 3,622,973 | 11/1971 | Domann | 340/52 R |
| 3,744,854 | 7/1973 | Ooya | 340/52 R |
| 3,772,698 | 11/1973 | Furia | 73/146 |
| 3,967,862 | 7/1976 | Hunter | 303/103 |
| 4,085,979 | 4/1978 | Leiber | 340/52 B |
| 4,116,494 | 9/1978 | Gudat | 340/52 B |
| 4,309,060 | 1/1982 | Leiber | 303/105 |
| 4,321,677 | 3/1982 | Takahashi | 303/95 |
| 4,420,191 | 12/1983 | Arikawa | 303/95 |
| 4,430,714 | 2/1984 | Matsuda | 303/105 |

FOREIGN PATENT DOCUMENTS

| | | |
|---|---|---|
| 1655432 | 3/1971 | Fed. Rep. of Germany. |
| 2258317 | 6/1974 | Fed. Rep. of Germany. |
| 2758529 | 8/1979 | Fed. Rep. of Germany. |

OTHER PUBLICATIONS

Literature Reference "Prufprogramm".

Primary Examiner—John W. Caldwell, Sr.
Assistant Examiner—Michael F. Heim
Attorney, Agent, or Firm—Frishauf, Holtz, Goodman & Woodward

[57] ABSTRACT

To determine aquaplaning or, in general, the adhesion factor of tires of a vehicle on a road surface, test braking pressure ($p_1$, $p_2$, $p_3$, $p_4$) is applied to a wheel or wheels, preferably the rolling wheels, of a vehicle. Wheel slip, that is, difference between deceleration of a wheel and deceleration of the vehicle is determined upon application of the test pressure, and an output signal is generated, indicated of wheel slippage, if a given wheel slip occurs at a test pressure below that which would be expected on a gripping or rough surface, so that wheel slippage with respect to the road surface is determined early. The test braking cycle can be initiated manually (switch 12) by an operator, from time to time, and, preferably, can be commanded automatically by an antibrake lock system (ABS, 10) by applying a braking pressure well below that required, for example, for vehicle operation under traffic conditions, and merely to determine wheel slippage.

19 Claims, 6 Drawing Figures

APPARATUS FOR ASCERTAINING THE ADHESION FACTOR OF A ROAD SURFACE

This application is a continuation of application Ser. No. 413,357, filed Aug. 19, 1982, now abandoned.

The present invention relates to apparatus to determine the adhesion factor of a wheel of a vehicle on a road surface, and more particularly to detect slippage or incipient slippage of a wheel with respect to a road surface, especially to determine aquaplaning of automotive wheels on a road surface.

BACKGROUND

In vehicles, especially road vehicles, devices are becoming increasingly well known which indicate the status of the road to the driver. Among these are ice warning indicators used together with on-board computers which trigger a warning indication within a temperature range in which icy road surfaces can be expected. However, these ice warning indicators have the disadvantage that although they do indicate the critical ambient temperature range, they provide no information as to the actual state of the road surface at that time or as to the road surface adhesion factor which is of importance in terms of the drivability of the road, because the adhesion factor does not automatically and directly vary with the ambient temperature.

The provision of devices indicating aquaplaning has also been proposed; such devices trigger a warning whenever a wheel, because of aquaplaning, loses its capacity to transmit friction to the road surface and thus loses peripheral velocity. Tests with various vehicles and various tires have demonstrated, however, that the state of aquaplaning, which is extraordinarily critical for vehicle controllability, occurs within a very narrow velocity range. The above-mentioned decrease in peripheral velocity occurs at a velocity which is only a few percent below a threshold velocity at which the wheels, due to aquaplaning conditions, are no longer capable of transmitting frictional forces. As a consequence, the aquaplaning warning comes, effectively, too late.

It is known to equip vehicles having power-assisted brakes with antiskid brake systems, that is, systems which by means of transducers ascertain variables during driving. Control variable signals are derived from the variables for varying the braking pressure. Such antiskid brake systems are described, for example, in "Bosch Technische Berichte" [Bosch Technical Reports], volume 7 (1980), No. 2 or in SAE Technical Paper No. 790458.

THE INVENTION

It is an object to provide an apparatus which will indicate to an operator of a vehicle whether a wheel is gripping a road surface, or may slip with respect thereto, for example to determine if a wheel is aquaplaning over a wet road surface. In effect, the method and apparatus determines the adhesion factor of the wheel with respect to the road surface.

The term "slip" will be used herein. Slip, in the field to which the present invention relates, is usually stated as follows, e.g. in the relevant literature:

$$\text{Slip} = (v_F - v_R)/v_F \cdot 100\%$$

wherein $v_F$ is the speed of the vehicle; and $v_R$ is the peripheral velocity of the wheel under consideration for slippage.

Brake slip is defined in the range of from 0% to 100%. A freely rolling unbraked wheel has a slip of 0%; a locked wheel has a slip of 100%. Actual slip is the slip of the wheel with respect to a road surface, and in limiting cases, again, a freely rolling wheel, on a gripping surface, will have a slip of 0%, whereas a locked wheel will have a slip of 100%. Intermediate the limiting values, the brake slip and the actual slip may, however, differ. For a detailed discussion of slip in connection with braking of vehicle wheels, reference is made to "Bosch Technische Berichte" [Bosch Technical Reports], English special edition of February 1982, "Antiskid System (ABS)", of which the present inventor is a co-author, pages 65 to 93, copy in the library of the U.S. Patent and Trademark Office.

Briefly, in accordance with the present invention, the brakes of a vehicle are actuated, either automatically or under operator control, to apply a predetermined and low pressure to the wheel of the vehicle, and then measure the deceleration of the wheel. If the deceleration of the wheel corresponds to the expected deceleration of the vehicle due to the braking, an indication is available that the surface on which the wheel runs is a good or gripping road surface. If, however, the test pressure applied results in a wheel deceleration which is in excess of that on a gripping surface, that is, if, at a given slip, braking pressure is less than that which it ought to have on a gripping surface, an indication will be provided that the wheel may be aquaplaning over the road surface. This indication, available in form of an electrical signal, can then be indicated as a warning signal to the operator.

The system is particularly simple to use in combination with an already existing antiskid or antibrake lock system, as well known in the industry, since the evaluation circuit for wheel slippage is already provided, and the only additional apparatus necessary is an apparatus to provide a braking pressure to the wheel of the vehicle, for example under operator control, and, if desirable, a hydraulic element which permits smooth and uniform build-up of braking pressure to the test level. This test level can be a very low braking level, extending over a time duration to keep the effect of the occupants of the vehicle, particularly the driver, to a minimum level.

The apparatus according to the invention has the advantage over the prior art that early and reliable recognition of a critical road-surface status is attainable by ascertaining the wheel-road adhesion factor. Antiskid system components which are known per se can be used, so that the apparatus according to the invention can be provided in a particularly simple and advantageous manner in vehicles having antiskid brake systems. The apparatus according to the invention can also be provided in other vehicles, use being made of components and circuits which are already known from antiskid brake system technology and have been developed to maturity in that field.

DRAWING

One exemplary embodiment of the invention is shown in the drawing and explained in greater detail in the following description. Shown are:

FIG. 1 is a block circuit diagram one one form of embodiment of an apparatus according to the invention; and FIGS. 2a and b and 3a, b, and c are velocity (v), pressure (p) and deceleration (dv/dt) diagrams, respectively, plotted with respect to time and used in explaining the mode of operation of the apparatus according to the invention.

DETAILED DESCRIPTION

Figure 1:
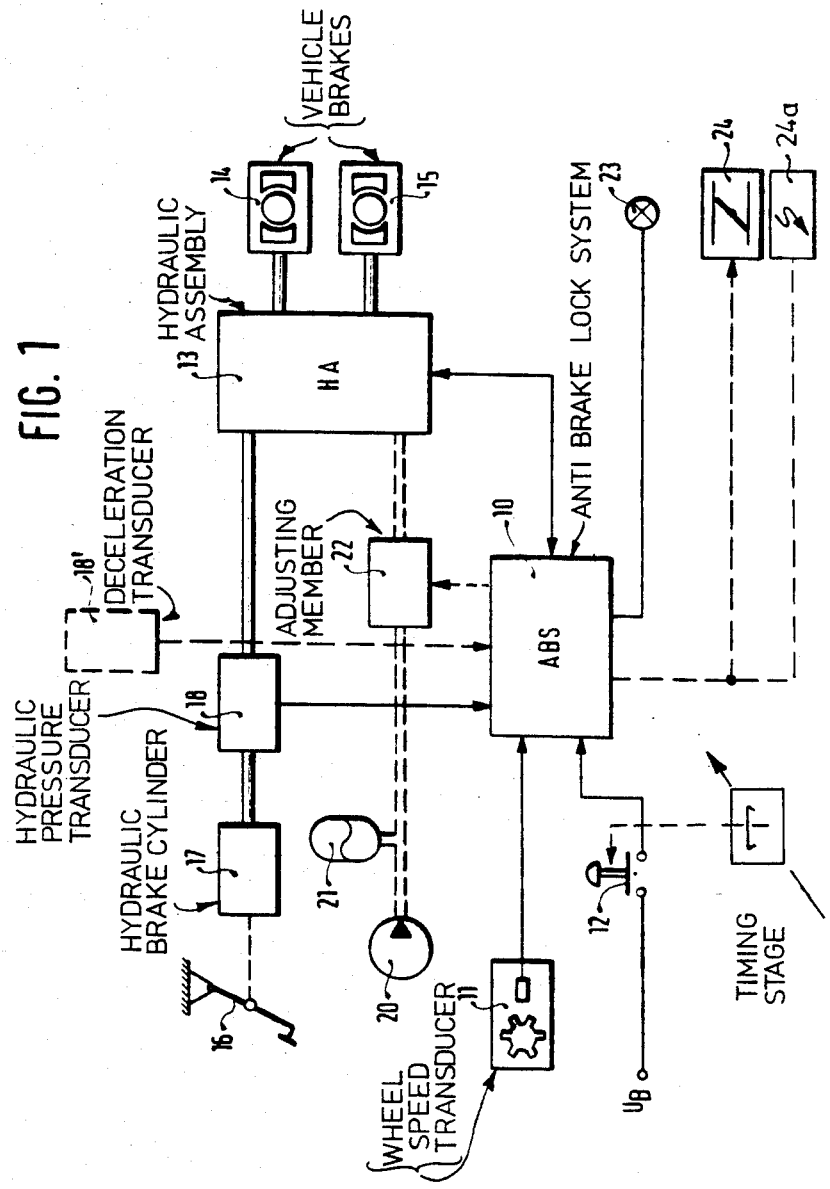

In FIG. 1, an antiskid control device or antibrake lock system, ABS, 10, receives input signals from a speed transducer 11. System 10 can be connected via a test switch 12 to an operating voltage $U_B$. The antiskid control device or system 10 controls a hydraulic assembly 13, which acts upon brakes 14, 15 of the vehicle. A brake pedal 16 is connected with a pressure control device 17, such as the brake cylinder of the vehicle, from whence there is a hydraulic connection via a pressure transducer 18 with the hydraulic assembly 13. The pressure transducer 18 or a deceleration transducer 18' furnishes an output signal to the antiskid control device 10.

A pump 20 is connected with a pressure reservoir 21 and is operatively connected via an adjusting member 22, which is controlled by the antiskid control device 10, with the hydraulic assembly 13.

Slippery road surface conditions are displayed on an indicator 23, connected, as shown, to the ABS system 10. Additionally, engine torque can be increased by control of fuel supply by throttle 24 and/or ignition timing, schematically shown at 24a, to compensate for the effect of braking.

Figure 2:
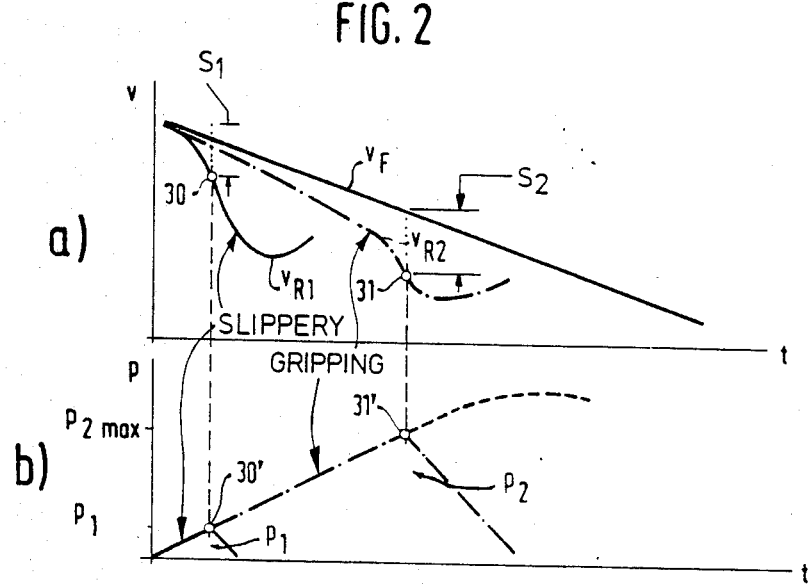
Figure 3:
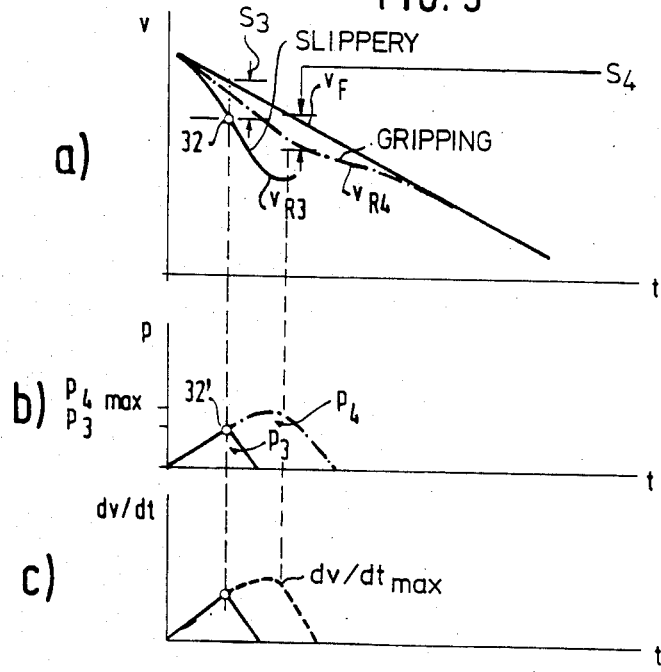

Operation with reference to the diagrams of FIGS. 2 and 3: The antiskid control device, ABS, 10 includes, at least, apparatus to carry out the functions of known antiskid control devices. These are used in order to indicate the slip value S of vehicle wheels with respect to a road surface and, in addition, to actuate the indicator 23 if a predetermined threshold is exceeded. The adhesion factor of the road surface is ascertained during a test cycle, which is initiated by, first, triggering of a test routine by actuating the test switch 12 in the computer circuit of the antiskid brake system 10 and, second, feeding of a test pressure into the hydraulic assembly 13. The pressure has a course which increases over time, as indicated in FIG. 2, graph b by the symbols $p_1$ and $p_2$ for two conditions of operation. In accordance with an embodiment of the invention, the test pressures $p_1$ or $p_2$ are provided directly, by means of the brake pedal 16 and the brake cylinder 17; when a given test pressure $p_1$ or $p_2$, depending on road or slippage conditions, is detected by the pressure transducer 18, an electrical signal is furnished to the antiskid control device, ABS, 10.

In accordance with another embodiment of the invention, the test pressures $p_1$, $p_2$ are established automatically, by a timer element T, or by repetitive actuation of the test switch 12. In that case, an increasing test pressure $p_1$, $p_2$ is applied to the hydraulic assembly 13 from the pump 20 via the adjusting member 22.

The result of increasing brake pressures $p_1$, $p_2$ in FIG. 2, graph b, results in a course of wheel velocity $v_{R1}$ or $v_{R2}$, as is shown in FIG. 2, graph a, in comparison with the vehicle velocity $v_F$. The courses $p_1$, $v_{R1}$ indicated in solid lines in FIG. 2 are for vehicle operation on a relatively slippery road surface, while the dot-dash courses $p_2$, $v_{R2}$ are for vehicle operation on a rough or gripping or skid-resistant road surface. As may be seen from FIG. 2, graph a, the wheel velocity drops rapidly in the first case, so that at point 30, for example, the predetermined slip threshold is exceeded. In the graph, the slip is represented by the difference in vehicle speed and wheel speed; when wheel speed and vehicle speed drop uniformly, there is, effectively, no slip. Duration of proportionality of decrease in wheel speed and vehicle speed is indicative of slip. The slip values are shown in the graphs (a) of FIGS. 2 and 3 at $S_1$, $S_2$, $S_3$, $S_4$, respectively. The test pressure $p_1$ is reduced from the associated value $p_1$ at point 30'. The second curve $v_{R2}$, drawn in dot-dash lines, shows that in case of a gripping road surface, the slip threshold is only attained at a substantially later time, specifically at point 31. The associated maximum test pressure value $p_{2max}$ is accordingly located substantially higher, at point 31', and the pressure $p_2$ is reduced only upon the attainment of this maximal value.

As may easily be seen from the diagrams for the two operational conditions in FIG. 2, in order to recognize a critical adhesion factor, it is not necessary to permit the test pressure p to increase to a very high level, e.g. $p_{2max}$, since at a critical stte of the road surface corresponding to $v_{R1}$ or $p_1$, the critical pressure $p_1$ is attained relatively rapidly. Allowing the test pressure to increase further is not necessary, first because sacrifices in driving comfort must be expected and second because if there is not slip at pressures above $p_1$, with a suitable setting of this threshold value, it can be presumed that the road surface does have a sufficiently high gripping or adhesion factor.

Based on the above analysis, it is possible to perform an automated test cycle such as that illustrated in FIG. 3. A test pressure of $p_3$ or selectively $p_4$ is established, which takes the course shown in FIG. 3, graph b, and corresponds to driving states such as those symbolized in FIG. 3, graph a by the wheel velocities $v_{R3}$ and $v_{R4}$. The solid-line curves $p_3$ and $v_{R3}$, in turn, represent conditions on a slippery road surface, while the curves $p_4$ and $v_{R4}$ represent conditions on a skid-resistant or gripping road surface. Upon the actuation of the test switch 12, a pressure is commanded which follows the curve $p_4$ both with respect to duration as well as amplitude or level. This means that no higher test pressure than the value $p_{4max}$ is ever commanded. In the case of a slippery road surface, the course or curve $p_3$ and $v_{R3}$ only will result, since wheel slip above the threshold was already recognized at point 32 in FIG. 3, graph a. If, in contrast, a sufficiently high adhesion factor exists, a test pressure course corresponding to $p_4$ in FIG. 3, graph b, is established, which is associated with a wheel velocity course $v_{R4}$ of FIG. 3, graph a. As already mentioned, the length of time and the amplitude of the pressure course $p_4$ are established such that, first, critical adhesion factors of the road surface are recognized reliably and, second, the sacrifice in driving comfort due to braking of the wheels is kept sufficiently small.

The deciding criterion for triggering an indication (in FIG. 1, by the indicator 23) is the association of the predetermined threshold value for the actual slip with the test pressure value at a particular time. If this threshold value is already attained at low test pressures $p_1$, $p_3$ this is an indication for a low adhesion factor on the part of the road surface, while the attainment of the threshold value at high test pressures $p_{2max}$, $> p_{4max}$ is an indication of a high road-surface adhesion factor. In a corresponding manner, the attainment of high or low vehicle deceleration (a signal from the transducer 18') can also be used as a criterion, because the deceleration is approximately proportional with the pressure, see FIG. 3, graph c, in which the ordinate represents deceleration.

It is also possible to continuously indicate the ratio of the test pressure or deceleration to the threshold value of the actual slip, or only upon the exceeding of a threshold value. In the first case, the advantage would be that the driver would also be furnished with an indication in the event of an approach close to a critical road-surface status.

The test cycle described in detail above can either be initiated by operator actuation of the test switch 12 or in a regularly recurring sequence by means of a timing control stage T, the latter enabling a continuous monitoring of the status of the road surface.

In a preferred form, the engine driving the vehicle is suitably controlled to increase engine torque during the course of a test cycle; this is schematically indicated in FIG. 1 by the dashed-line connection with the throttle valve 24 and ignition system 24a. It is understood that the intervention into engine operation can naturally also be made via both the ignition, or a fuel supply, e.g. a fuel injection system and the like.

It is particularly efficacious to apply the rest pressure only on the rolling wheels of the vehicle, i.e. the wheels which are not driven, and to increase the engine torque during the period when the test pressure becomes effective.

In a preferred realization of the invention, the duration of the increase in test pressure is made adjustable, as schematically indicated by the arrow through timing state T, in order to be able to keep the effect on the occupants in the vehicle small, by reducing the jolting or jerking of the vehicle. The influence of vehicle inertia on evaluation of the deceleration signal can be reduced by this provision.

I claim:

1. Apparatus to determine the adhesion factor of wheels on a vehicle on a road surface, wherein the vehicle has
    power assisted brakes (14, 15);
    means (16, 17; 20, 21, 22; 13) for applying braking pressure to the brakes; and
    means (10, 11) for determining slip (S) of a wheel or wheels of the vehicle with respect to the road surface,
    comprising, in accordance with the invention,
    means (12) for applying an increasing test braking pressure ($p_1$, $p_2$, $p_3$, $p_4$) to a wheel or wheels of the vehicle;
    slip determination means (10) responsive to peripheral wheel speed and to vehicle speed and determining wheel slip upon application of the test pressure to the brakes, and generating an output signal (23) if, when the slip exceeds a given value upon application of test pressure to the brakes of the vehicle, the test pressure has not exceeded a predetermined level.

2. Apparatus according to claim 1, wherein the means for applying braking pressure includes a hydraulic assembly;
    and said test pressure is applied gradually in increasing braking level by the hydraulic assembly to the brakes (14, 15).

3. Apparatus according to claim 2, wherein the hydraulic assembly applies the increasing brake pressure at a controllable rate.

4. Apparatus according to claim 2, including a timing stage (T) connected to an ABS (10) to control the time duration of application of the test pressure to the brakes.

5. Apparatus according to claim 1, wherein the means for applying braking pressure comprises operator controlled brake application means (16, 17); and
    a pressure transducer (18) is provided furnishing an output signal when the pressure on the brakes reaches a predetermined level corresponding to a maximum test pressure level.

6. Apparatus according to claim 1, including an antibrake lock or antiskid system (ABS) (10) connected to and controlling application of braking pressure to the vehicle brakes (14, 15), wherein the slip determination means form part of said ABS (10) and controls the test braking pressure to decrease if the slip determined by the slip determination means exceeds said predetermined threshold level.

7. Apparatus according to claim 2, wherein the brakes to which the test braking pressure is applied are the brakes associated with the rolling wheels of the vehicle only.

8. Apparatus according to claim 1, wherein the vehicle includes a drive engine;
    and further comprising means (10; 24, 24a) connected to the drive engine to increase torque on the engine during application of the braking pressure by the braking pressure application means.

9. Apparatus according to claim 6, including switching means (12) connected to and controlling the ABS (10) to apply a test braking pressure to a wheel or wheels of the vehicle, and to discontinue application of test braking pressure if
    (a) the slip determination means determines that the slip has exceeded the predetermined threshold level; or
    at least one of:
    (b-1) a predetermined test pressure level ($p_{4max}$) has been reached;
    (b-2) the vehicle has decelerated by a pedetermined amount ($dv/dt_{max}$).

10. Apparatus according to claim 1, wherein the slip determination means includes
    braking pressure sensing means monitoring the braking pressure and providing a signal when the test pressure has exceeded a predetermined level.

11. Apparatus according to claim 1, wherein the slip determination means includes
    means (10) for sensing a change in proportionality of wheel speed and vehicle speed upon application of test pressure to the brakes.

12. Apparatus to determine the adhesion factor of wheels on a vehicle on a road surface, wherein the vehicle has
    power assisted brakes (14, 15);
    means (16, 17; 20, 21, 22; 13) for applying braking pressure to the brakes; and
    means (10, 11) for determining slip (S) of a wheel or wheels of the vehicle with respect to the road surface,
    comprising, in accordance with the invention,
    means (12) for applying an increasing test braking pressure ($p_1$, $p_2$, $p_3$, $p_4$) to a wheel or wheels of the vehicle;

slip determination means (10) responsive to peripheral wheel speed and to vehicle speed and determining wheel slip upon application of the test pressure to the brakes, and generating an output signal (23) if, when the slip exceeds a given value upon application of test pressure to the brakes of the vehicle, the deceleration of the vehicle has not exceeded a predetermined level.

13. Apparatus according to claim 12, wherein the means for applying braking pressure includes a hydraulic assembly;

and said test pressure is applied gradually in increasing braking level by the hydraulic assembly to the brakes (14, 15).

14. Apparatus according to claim 13, wherein the hydraulic assembly applies the increasing brake pressure at a controllable rate.

15. Apparatus according to claim 13, including a timing stage (T) connected to an ABS (10) to control the time duration of application of the test pressure to the brakes.

16. Apparatus according to claim 12, wherein the means for applying braking pressure comprises operator controlled brake application means (16, 17); and a pressure transducer (18) is provided furnishing an output signal when the pressure on the brakes reaches a predetermined level corresponding to a maximum test pressure level.

17. Apparatus according to claim 12, including an antibrake lock or antiskid system (ABS) (10) connected to and controlling application of braking pressure to the vehicle brakes (14, 15), wherein the slip determination means form part of said ABS (10) and controls the test braking pressure to decrease if the slip determined by the slip determination means exceeds said given value.

18. Apparatus according to claim 13, wherein the brakes to which the test braking pressure is applied are the brakes associated with the rolling wheels of the vehicle only.

19. Apparatus according to claim 12, wherein the vehicle includes a drive engine;

and further comprising means (10; 24, 24a) connected to the drive engine to increase torque on the engine during application of the braking pressure by the braking pressure application means.

* * * * *